(12) United States Patent
Takagishi et al.

(10) Patent No.: US 11,041,448 B2
(45) Date of Patent: Jun. 22, 2021

(54) FUEL INJECTION DEVICE FOR ENGINES

(71) Applicant: Yanmar Co. Ltd., Osaka (JP)

(72) Inventors: Isao Takagishi, Osaka (JP); Masaki Nanko, Osaka (JP); Ryota Iwano, Osaka (JP); Hiroyuki Machiyama, Osaka (JP); Kenichi Nakaguchi, Osaka (JP); Yusei Fukuda, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 0 days.

(21) Appl. No.: 16/652,420

(22) PCT Filed: Aug. 8, 2018

(86) PCT No.: PCT/JP2018/029769
§ 371 (c)(1),
(2) Date: Mar. 31, 2020

(87) PCT Pub. No.: WO2019/077853
PCT Pub. Date: Apr. 25, 2019

(65) Prior Publication Data
US 2020/0284208 A1    Sep. 10, 2020

(30) Foreign Application Priority Data

Sep. 29, 2017  (JP) .............................. JP2017-191407

(51) Int. Cl.
*F02D 1/04*      (2006.01)
*F16C 11/04*     (2006.01)
(Continued)

(52) U.S. Cl.
CPC ............... *F02D 1/04* (2013.01); *F02D 1/045* (2013.01); *F16C 11/04* (2013.01); *F02D 41/30* (2013.01);
(Continued)

(58) Field of Classification Search
CPC ... F02D 1/04; F02D 1/045; F02D 1/10; F02D 2001/004; F02D 41/30; F02D 2700/0284; F16C 11/04
(Continued)

(56) References Cited

FOREIGN PATENT DOCUMENTS

DE          3922338 C1 *  4/1990  ............... F02D 1/10
JP     1979-S54-113950       8/1979
(Continued)

*Primary Examiner* — Mahmoud Gimie
(74) *Attorney, Agent, or Firm* — Chris Mizumoto

(57) ABSTRACT

A technology that can extend the life of a fuel injection device of an engine while maintaining its good responsiveness is provided. A fuel injection device 100 for an engine includes: a control rack 55 supported to be slidable in an axial direction and capable of adjusting of a fuel pressure-feed amount of a fuel pressure-feed mechanism unit 51, based on its slide-position relative to the axial direction; an actuator 40 capable of reciprocating its operating unit 41; and a link lever 20 swingably supported by a pivot shaft member 25 and configured to swing in association with reciprocation of the operating unit 41 of the actuator 40 thereby causing the control rack 55 to slide, wherein the fuel injection device includes an actuator-side connecting part 20A connecting an operating unit 41 of the actuator 40 to the link lever 20, and the actuator-side connecting part 20A is positioned on the same axis as the operating unit 41 of the actuator 40.

8 Claims, 8 Drawing Sheets

(51) Int. Cl.
   *F02D 41/30* (2006.01)
   *F02D 1/00* (2006.01)
(52) U.S. Cl.
   CPC ............... *F02D 2001/004* (2013.01); *F02D 2700/0284* (2013.01)
(58) Field of Classification Search
   USPC ................................................ 123/373, 364
   See application file for complete search history.

(56) References Cited

FOREIGN PATENT DOCUMENTS

| | | | | |
|---|---|---|---|---|
| JP | 1983-S58-35629 | 3/1983 | | |
| JP | 58041235 A | * 3/1983 | ............ | F02D 41/38 |
| JP | S58-33747 | 3/1983 | | |
| JP | 58131325 A | * 8/1983 | ........... | F02M 59/447 |
| JP | H02-012291 | 4/1990 | | |
| JP | H07-259581 | 10/1999 | | |
| JP | 2011-106110 | 6/2011 | | |

\* cited by examiner

FUEL INJECTION DEVICE FOR ENGINES

CROSS-REFERENCE

This application is a national phase of an international application, PCT/JP2018/035891 filed on Aug. 8, 2018, which claims the benefit of Japanese Application No. 2017-201776 filed on Oct. 18, 2017.

TECHNICAL FIELD

The present invention relates to a fuel injection device of an engine, including: a control rack supported slidably in an axial direction and capable of adjusting a fuel pressure-feed amount of a fuel pressure-feed mechanism unit, based on its slide-position relative to the axial direction; an actuator capable of reciprocating its operating unit along an operating shaft; and a link lever swingably supported by a pivot shaft member and configured to swing in association with reciprocation of the operating unit of the actuator thereby causing the control rack to slide.

BACKGROUND ART

A diesel engine and the like having a mechanical fuel injection pump include a fuel injection device for controlling a fuel pressure-feed amount of a fuel pressure-feed mechanism unit according to controls of a load and a rotation number of the engine (see, for example, Patent Literature 1; hereinafter, PTL 1).

In the fuel injection device of such an engine, reciprocation of an operating unit of an actuator causes a link lever to swing in conjunction with the reciprocation of the operating unit. Further, in conjunction with the swing of the link lever, a control rack slides in an axial direction of the operating unit. By controlling the actuator based on a control signal from an engine control unit, a slide-position of the control rack relative to the axial direction can be adjusted to set the fuel pressure-feed amount of the fuel pressure-feed mechanism unit to a suitable amount.

CITATION LIST

Patent Literature

PTL 1: Japanese Patent Application Laid-Open No. 2008-297918

SUMMARY OF INVENTION

Technical Problem

In a traditional fuel injection device as described above, an actuator is typically arranged nearby a center portion of the device main body. However, since the control rack is arranged on a lateral side of the fuel pressure-feed mechanism unit, the control rack and the link lever are arranged laterally offset from the position nearby the center portion.

Therefore, a point of action where a load from the link lever acts on an operating shaft of the actuator is in a position laterally deviated with respect to the operating shaft of the actuator. In such a structure, a relatively large bending moment is applied to the operating shaft, while the operating unit of the actuator is reciprocated along the operating shaft. This causes excessive progress in the abrasion of a sliding member such as the operating shaft and the like of the actuator, which leads to a concern for deteriorated responsiveness, damages, and the like.

In view of the above circumstances, a primary object of the present invention is to provide a technology that can extend the life of a fuel injection device of an engine while maintaining its good responsiveness.

Solution to Problem

A first feature configuration of the present invention is a fuel injection device of an engine including: a control rack supported to be slidable in an axial direction and capable of adjusting a fuel pressure-feed amount of a fuel pressure-feed mechanism unit based on its slide-position relative to the axial direction;

an actuator capable of reciprocating its operating unit along an operating shaft; and a link lever swingably supported by a pivot shaft member and configured to swing in association with reciprocation of the operating unit of the actuator thereby causing the control rack to slide, wherein the fuel injection device includes an actuator-side connecting part connecting the operating unit of the actuator to the link lever, the actuator-side connecting part is positioned on the operating shaft of the actuator, and a rack-side connecting part connecting the control rack to the link lever, the link lever has, on two sides of the operating unit of the actuator sandwiching therebetween the operating unit, a pair of lever members pivotally supported by the pivot shaft member in such a manner as to integrally swing, the actuator-side connecting part is configured with a penetration pin bridged between the pair of lever members penetrating the operating unit of the actuator, both of the lever members being connected to the operating unit of the actuator, and the rack-side connecting part is configured so that an extended part formed by extending one of the lever members to a side opposite to the pivot shaft member with respect to a longitudinal direction of the lever member is connected to the control rack via an arm.

In this configuration, when the operating unit of the actuator reciprocates along its operating shaft thus swinging the link lever, a load from the link lever acts in a direction of the operating shaft on the operating shaft of the actuator at the actuator-side connecting part. This way, a bending moment applied to the operating unit of the actuator can be reduced, and excessive progress in the abrasion of the sliding member of the actuator can be suppressed or reduced.

Thus, the present invention can achieve a fuel injection device of an engine that can extend the life while maintaining good responsiveness.

Further, the link lever has the pair of lever members that integrally swing, and the actuator-side connecting part is configured by connecting the pair of lever members to the operating unit of the actuator from both sides of the operating unit in such a manner as to sandwich therebetween the operating unit. This way, to the operating shaft of the actuator, a load is applied in the direction of the operating shaft, substantially evenly from both sides. As a result, the configuration can cause a load from the link lever to act along the operating shaft on the operating shaft of the actuator at the actuator-side connecting part.

Further, the actuator-side connecting part with the pair of lever members connected to the operating unit of the actuator is configured by adopting a reasonable configuration in which both end sides of the penetration pin penetrating the operating unit of the actuator are fixed to the pair of lever members arranged on the two sides of the operating unit sandwiching therebetween the operating unit, respectively. This configuration can achieve a reduction of a bending moment applied to the operating shaft of the actuator.

A second feature configuration of the present invention may include a biasing member configured to bias the link lever in one of swinging directions of the link lever, wherein the biasing member is connected to the rack-side connecting part.

A biasing member configured to bias the link lever in one of swinging directions of the link lever is provided.

A position where the biasing member is connected to the link lever and a center of the operating unit of the actuator are on a same plane perpendicularly crossing the axis of a swing shaft of the link lever.

This configuration including the biasing member configured to bias the link lever to one of the swing directions can suppress and reduce rattling of the link lever and achieve smooth sliding of the control rack. Further, in this configuration with such a biasing member, a position where the biasing member is connected to the link lever and the center of the operating unit of the actuator are on a same plane perpendicularly crossing the axis of the swing shaft of the link lever. Therefore, even when a biasing force from the biasing member is applied to the link lever, the biasing force is not transmitted as a bending moment, but as a load in the direction corresponding to the operating shaft, to the operating shaft of the actuator. Therefore, progress in the abrasion attributed to the bending moment on the sliding member of the actuator can be suppressed or reduced.

It should be noted that an end of the biasing member opposite to the connection part on the link lever may be fixed to a suitable position. For example, by connecting the opposite end of the biasing member to the main body side of the actuator, a bending moment applied to the operating shaft of the actuator can be further reduced.

A fifth feature configuration of the present invention is such that a side wall portion of a housing unit accommodating the operating unit of the actuator has an insertion port through which the penetration pin is inserted into the actuator-side connecting part.

In an assembling work for such an actuator-side connecting part in which the penetration pin bridged between the pair of lever members penetrates the operating unit of the actuator, the side wall portion of the housing unit on a lateral side of the pair of lever members may be an obstacle for inserting the penetration pin from the lateral side.

With this configuration, however, the insertion port is formed on the side wall portion of the housing unit. Therefore, the penetration pin can be inserted from the lateral side of the pair of lever members through the insertion port. This configuration can downsize the device by narrowing the space between the side wall portion of the housing unit and the pair of lever members as much as possible, while achieving easier assembling work.

A sixth feature configuration of the present invention is such that the penetration pin is configured to be separable into a plurality of pieces in its axial direction.

In this configuration, the penetration pin is separable into a plurality of pieces in its axial direction. Therefore, in the assembling work of the actuator-side connecting part, even if there is not a sufficient space for inserting the penetration pin from the lateral side of the pair of lever members, the penetration pin can be separated into pieces and these separated pieces of the penetration pin can be inserted from the lateral sides of the pair of lever members. This configuration can downsize the device by narrowing the space between the side wall portion of the housing unit and the pair of lever members as much as possible, while achieving easier assembling work.

A seventh feature configuration of the present invention is such that the operating unit of the actuator has a bearing member into which the penetration pin is inserted, and the bearing member is not movable with respect to the operating unit in reciprocating directions of the operating unit but is slidable relative to the operating unit in a swing axis traverse direction, the swing axis traverse direction being perpendicular to the axis of the pivot shaft member and passing through the actuator-side connecting part and the rack-side connecting part.

In this configuration, the penetration pin is journaled by the bearing member provided to the operating unit of the actuator. Therefore, the operating unit of the actuator and the penetration pin can be connected by surface contact through the bearing member, while avoiding line-contact which progresses abrasion. Further, the penetration pin can be supported to be slidable in the swing axis traverse direction, while rattling in the reciprocating directions of the operating unit is suppressed or reduced. This way, reciprocation of the operating unit can be suitably transmitted to the link lever through the penetration pin.

An eighth feature configuration of the present invention is such that the operating unit of the actuator is separable into front and rear pieces along the reciprocating directions of the operating unit so as to allow insertion of the penetration pin into a pin through hole from a radial direction of the pin through hole, the pin through hole being a hole in which the penetration pin penetrates.

In this configuration, the penetration pin can be inserted into the pin through hole from a radial direction of the pin through hole while the operating unit is separated, and the operating unit can be assembled thereafter. This way, a space for inserting the penetration pin from the lateral side is not necessary, and the device can be further downsized.

DESCRIPTION OF EMBODIMENTS

The following describes an embodiment of the present invention based on the attached drawings.

Figure 1:
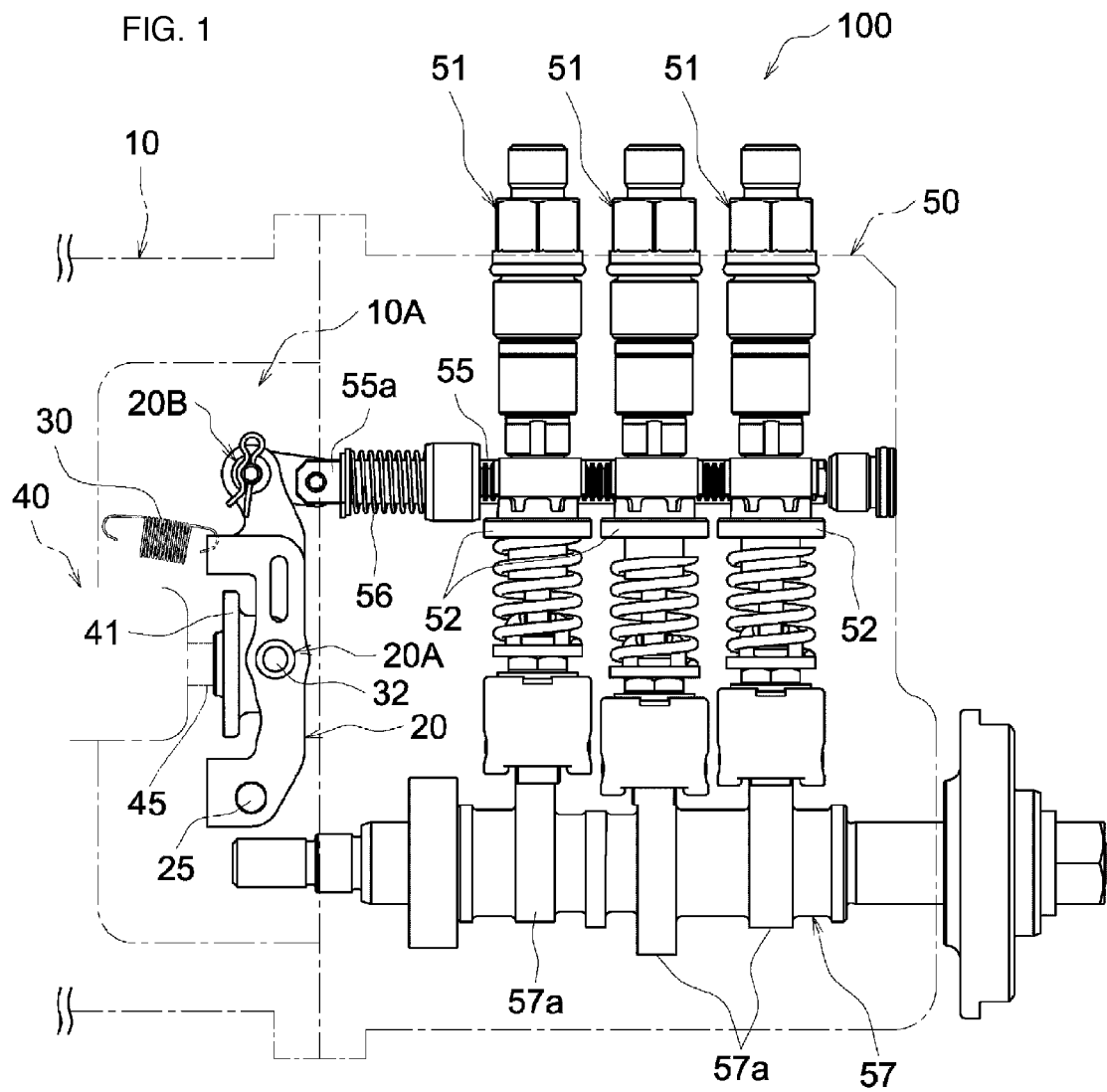
FIG. 1 A side view showing a configuration of a fuel injection device of an engine.

As shown in FIG. 1, a fuel injection device 100 of the present embodiment is configured to control a fuel injection amount in a diesel engine. The fuel injection device 100 includes a governor 10 having an actuator 40 whose operation is controlled based on controls of a load or rotation number of the engine, and a fuel pump 50 having a fuel pressure-feed mechanism unit 51.

The fuel pump 50 includes a plurality of fuel pressure-feed mechanism units 51 which are arranged side-by-side, and which are configured to intermittently pressure-feed liquid fuel to nozzles of cylinders of the diesel engine and causes the nozzles to inject the liquid fuel. On a lateral-side (the rear side in FIG. 1) of the plurality of fuel pressure-feed mechanism units 51, there is a control rack 55 configured to adjust a fuel pressure-feed amount of the fuel pressure-feed mechanism units 51 to the corresponding nozzles of the cylinders. The control rack 55 is supported in a slidable manner along its axis, in a posture that traverses a lateral side of the plungers 52 of the plurality of fuel pressure-feed mechanism units 51.

Further, on the plunger 52 side of the fuel pressure-feed mechanism units 51 (lower side in FIG. 1), a camshaft 57 having cams 57a for moving plungers 52 up and down are journaled. With this camshaft 57 driven and rotated, the cams 57a arranged on the camshaft 57 pumps (moves up and down) the plungers 52 of the fuel pressure-feed mechanism units 51, respectively. The pumping of these plungers 52 can compress the liquid fuel in the fuel pressure-feed mechanism units 51.

Further, the fuel pressure-feed mechanism units 51 are each configured in such a manner that the fuel pressure-feed amount can be adjusted in association with a change in the position of a fuel supply port, by changing a slide-position of the control rack 55 relative to the axial direction.

In the present embodiment, a direction (the rightward direction in FIG. 1) in which the control rack 55 slides from the governor 10 side toward the fuel pump 50 side in the axial direction is referred to as "push direction". On the contrary, a direction (the leftward direction in FIG. 1) in which the control rack 55 slides from the fuel pump 50 side toward the governor 10 side in the axial direction is referred to as "pull direction".

The fuel pressure-feed mechanism unit 51 is structured so that, for example, the fuel pressure-feed amount is reduced when the control rack 55 slides in the push direction, and that the fuel pressure-feed amount increases when the control rack 55 slides in the pull direction. One end side of the control rack 55 has a connection end portion 55a which is connected to the link lever 20 in the housing unit 10A of the later-described governor 10. Further, the fuel pump 50 is provided with an auxiliary spring 56 and the like that assists the control rack 55 to slide in the pull direction.

Figure 2:
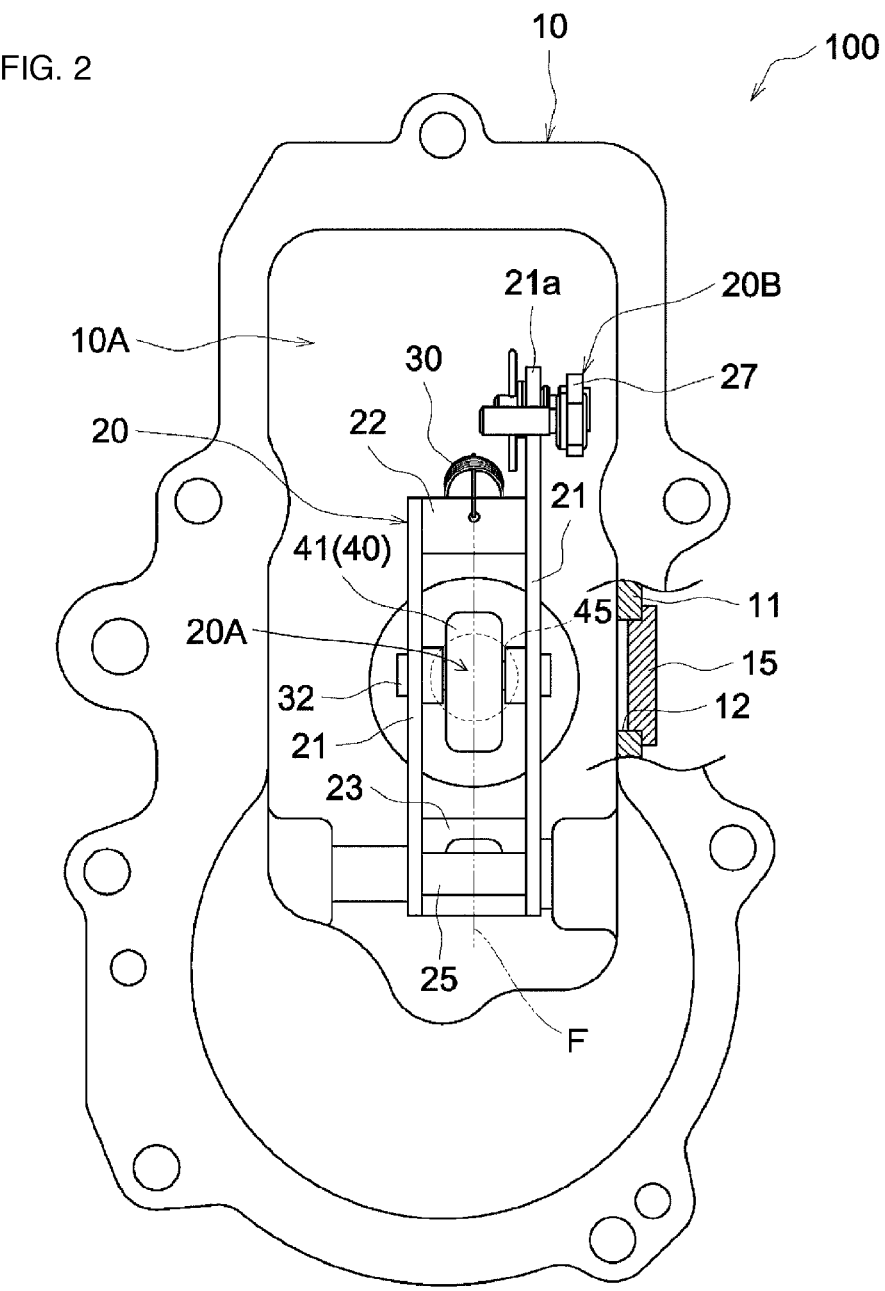
FIG. 2 A front view of a housing unit in which an operating unit of an actuator is accommodated.

The governor 10 is connected to a side of the fuel pump 50, on which side the connection end portion 55a of the control rack 55 is arranged. As shown in FIG. 1 and FIG. 2, the governor 10 has a housing unit 10A that faces the fuel pump 50.

On a side of the governor 10 opposite to the fuel pump 50, an electrically operated actuator 40 is attached. This actuator 40 includes an operating unit 41 arranged in the housing unit 10A of the governor 10, and is configured to reciprocate this operating unit 41 along an operating shaft 45 substantially parallel to the direction in which the control rack 55 slides.

A link lever 20 is provided in the housing unit 10A of the governor 10. The link lever 20 is swingably supported by a pivot shaft member 25 whose axis is perpendicular and skew to the sliding direction of the control rack 55. This swingably supported link lever 20 has an actuator-side connecting part 20A connected to the operating unit 41 of the actuator 40, and a rack-side connecting part 20B connected to the connection end portion 55a of the control rack 55. These connecting parts 20A and 20B are provided side-by-side along a direction substantially perpendicular to the axis of the pivot shaft member 25. The actuator-side connecting part 20A is between the pivot shaft member 25 and the rack-side connecting part 20B.

In the link lever 20, a direction corresponding to the axis of the pivot shaft member 25 is referred to as "swing axial direction", a direction perpendicular to the axis of the pivot shaft member 25 and passing through the actuator-side connecting part 20A and the rack-side connecting part 20B is referred to as "swing axis traverse direction".

To a predetermined portion of the link lever 20, one end of a spring 30 (an exemplary biasing member) is connected. The other end of the spring 30 is connected to a connecting tool 31 (see FIG. 3) fixed on the bottom portion side of the housing unit 10A of the governor 10. In other words, the spring 30 applies, to the link lever 20, a biasing force in a direction toward one of the swinging directions of the link lever 20, thereby suppressing and reducing rattling of the link lever 20. The connecting tool 31 connecting the spring 30 to the bottom portion side of the housing unit 10A can be fixed to a suitable position of the governor 10. For example, this connecting tool 31 can be fixed to a main body side of the actuator 40. This way, a bending moment applied to the operating shaft 45 of the actuator 40 can be further reduced.

In the fuel injection device 100, when the actuator 40 reciprocates the operating unit 41 along its operating shaft 45, the link lever 20 swings about the pivot shaft member 25. With the swing of the link lever 20, the control rack 55 connected to the link lever 20 slides in the push direction or the pull direction. That is, by controlling the actuator 40 based on a control signal from an engine control unit (not shown), the slide-position of the control rack 55 relative to the axial direction is adjusted. In association with this adjustment, the fuel pressure-feed amount of the fuel pressure-feed mechanism unit 51 can be suitably set.

The fuel injection device 100 of the present embodiment has a feature configuration for achieving a long life while maintaining good responsiveness. This is further detailed hereinbelow.

The actuator-side connecting part 20A connecting the operating unit 41 of the actuator 40 to the link lever 20 is arranged on the axis of the operating shaft 45 of the actuator 40.

Figure 3:
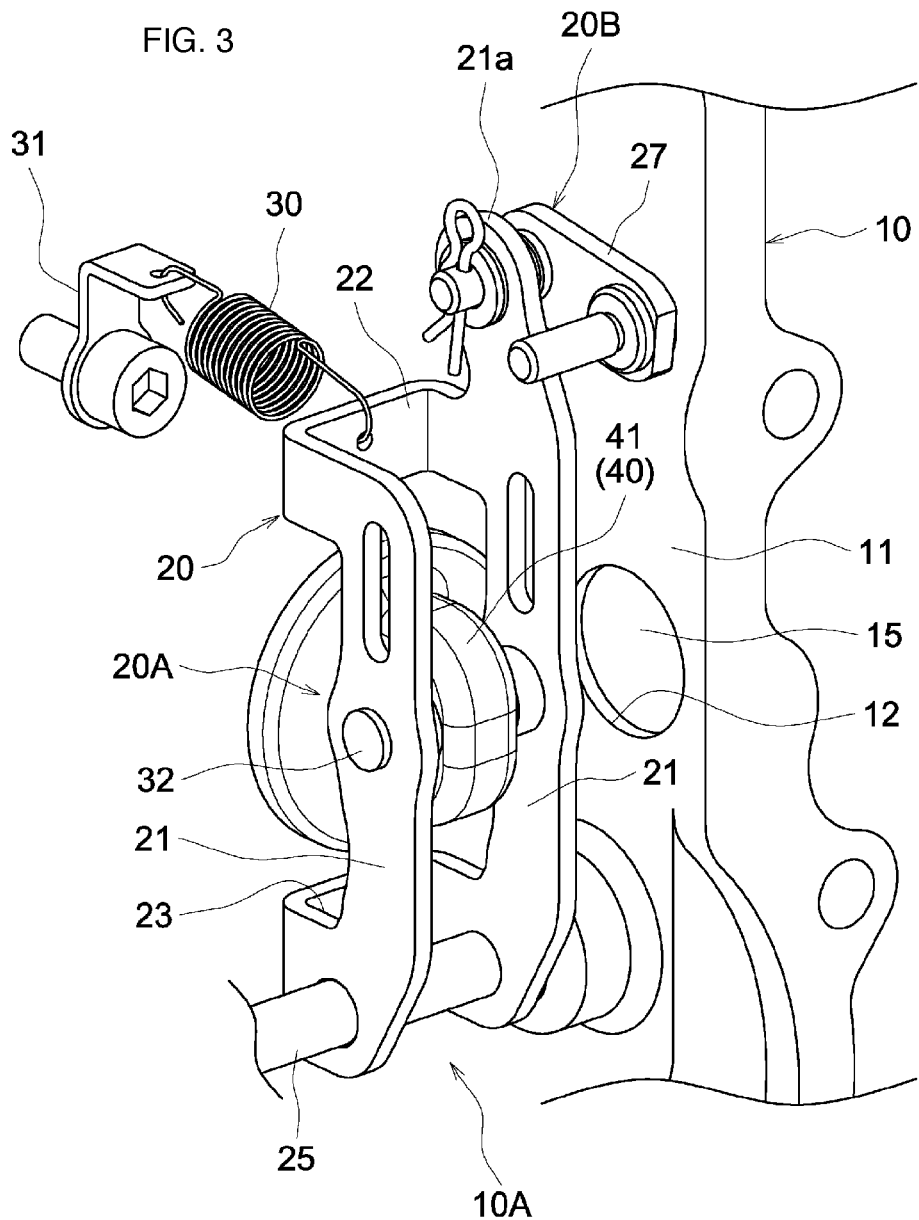
FIG. 3 A perspective view of the housing unit in which the operating unit of the actuator is accommodated.

As shown in FIG. 2 and FIG. 3, the link lever 20 has a pair of lever members 21 which are pivotally supported by the pivot shaft member 25 in such a manner as to integrally swing. The link members 21 are arranged on two sides of the operating unit 41 of the actuator 40 sandwiching therebetween the operating unit 41. With a penetration pin 32 bridged between the pair of lever members 21 penetrating the operating unit 41 of the actuator 40, the actuator-side connecting part 20A connects both of the lever members 21 to the operating unit 41 of the actuator 40.

As to the rack-side connecting part 20B, on the other hand, one of the lever members 21 is extended to from the side opposite to the pivot shaft member 25, and this extended part 21a is connected to the connection end portion 55a of the control rack 55 via an arm 27. It should be noted that, in the present embodiment, the rack-side connecting part 20B is provided to one of the lever members 21. However, both of the lever members 21 may be extended to the side opposite to the pivot shaft member 25, and the connection end portion 55a of the control rack 55 may be connected to a pin bridged between both extended parts.

The link lever 20 having the pair of lever members 21 is configured by bending two sides of a plate member in the same direction to form a U-shaped cross-section, and the portions bent are used as the pair of lever members 21. That is, the pair of lever members 21 of the link lever 20 are formed as a plate-like member parallel to each other and arranged on both sides of the operating unit 41, with their thickness directions corresponding to the swing axial direction. Further, the pair of lever members 21 are connected to each other via a pair of coupling portions 22 and 23 on both the pivot shaft member 25 side and the rack-side connecting part 20B side.

In the link lever 20 configured as described above, the in-plane directions of the lever members 21 are oriented along the direction of load applied to the pivot shaft member 25, the actuator-side connecting part 20A, and the rack-side connecting part 20B. This improves the rigidity of the link lever 20 with respect to the load. The number of coupling portions 22 and 23 connecting the pair of lever members 21 may be suitably modified in consideration of the rigidity of the lever members 21 and the like.

As described hereinabove, the fuel injection device 100 reciprocates the operating unit 41 of the actuator 40 along the operating shaft 45 to swing the link lever 20. To swing the link lever 20, a load is applied in a reciprocating direction to the operating unit 41 of the actuator 40, substantially evenly from both sides of the operating unit 41, through the penetration pin 32. That is, at the actuator-side connecting part 20A, a load from the link lever 20 acts on the operating shaft 45 of the actuator 40 along the operating shaft 45. This way, a bending moment applied to the operating shaft 45 of the actuator 40 is reduced, and excessive progress in the abrasion of the sliding member of the actuator 40 can be suppressed or reduced. Therefore, the life of the actuator 40 can be extended by suppressing or reducing damages and the like attributed to abrasion, while good responsiveness of the actuator 40 is maintained.

Further, a portion of the link lever 20 connecting to the spring 30 for suppressing or reducing rattling of the link lever 20 deviates from the axis of the operating shaft 45 of the actuator 40 in the swing axis traverse direction. Specifically, the spring 30 is connected to the link lever 20 at a coupling portion 22, out of the pair of coupling portions 22 and 23 connecting the pair of lever members 21, on the rack-side connecting part 20B side. Further, the portion connecting the spring 30 to the link lever 20 and the center of the operating unit 41 of the actuator 40 are arranged on the same plane F (see FIG. 2) perpendicularly crossing the swing axis of the link lever 20.

Figure 7:
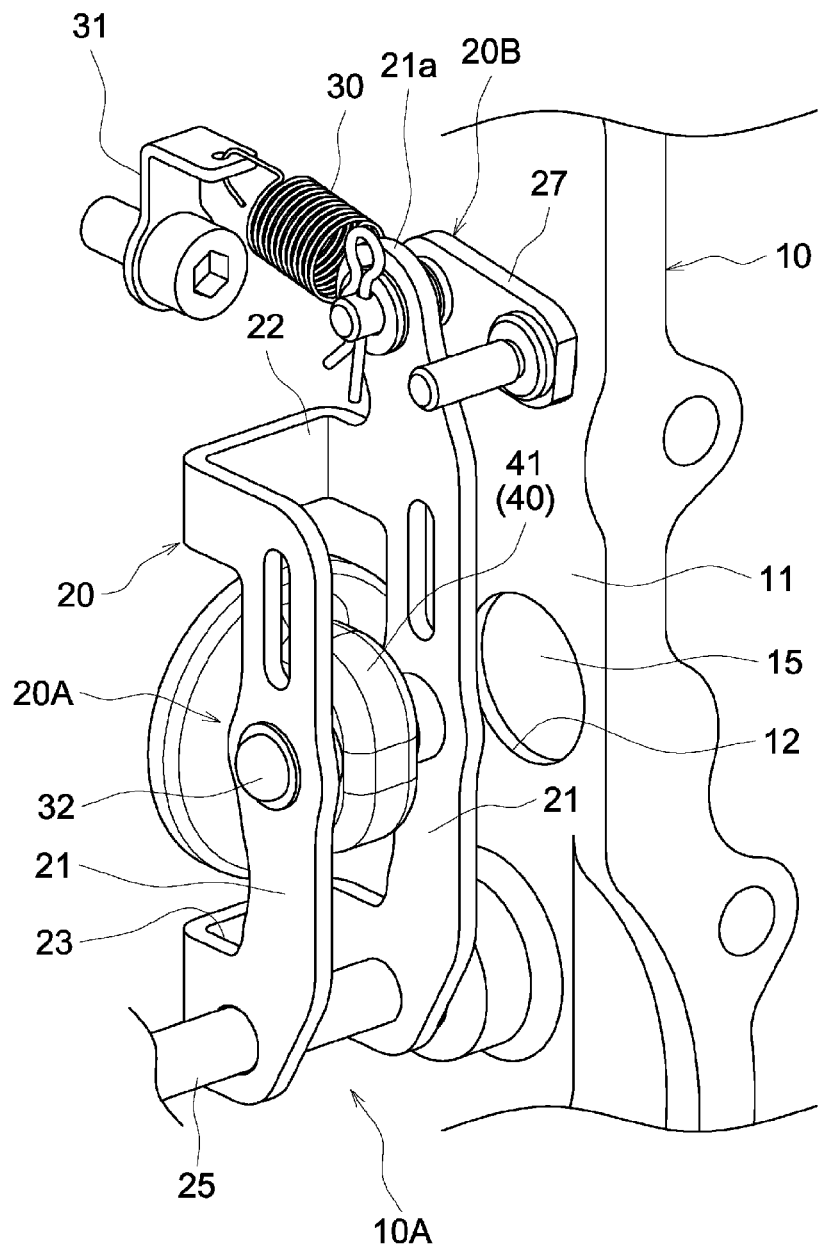
FIG. 7 A perspective view of a housing unit in which the operating unit of the actuator in another embodiment is accommodated.

That is, the biasing force applied from the spring 30 to the link lever 20 is suitably transmitted to the operating shaft 45 of the actuator 40 as a load in the direction of the axis of the operating shaft 45, without generating a bending moment that causes progress of abrasion. It should be noted that the portion of the link lever 20 connecting to the spring 30 can be suitably changed. For example, as shown in FIG. 7, the spring 30 can be connected to the rack-side connecting part 20B. Further, the spring 30 may be omitted as needed provided that, for example, the rattling of the link lever 20 is not a problem, or that the rattling can be suppressed or reduced by different means.

As shown in FIG. 2 and FIG. 3, an insertion port 12 is formed in a side wall portion 11 of the housing unit 10A accommodating the operating unit 41 of the actuator 40. The insertion port 12 is formed along the axial direction of the penetration pin 32 of the actuator-side connecting part 20A. This insertion port 12 is formed so the penetration pin 32 can be inserted into the actuator-side connecting part 20A. With this insertion port 12, the penetration pin 32 can be easily inserted from a lateral side of the pair of lever members 21 through the insertion port 12 during assembling work of the actuator-side connecting part 20A, even if the space between the side wall portion 11 of the housing unit 10A and the pair of lever members 21 is narrow. Then, after the assembling work, the insertion port 12 can be closed by a plug 15 and the like.

It should be noted that the insertion port 12 can be omitted, if the penetration pin 32 can be inserted into the operating unit 41 without using the insertion port 12, in the assembling work.

Figure 4:
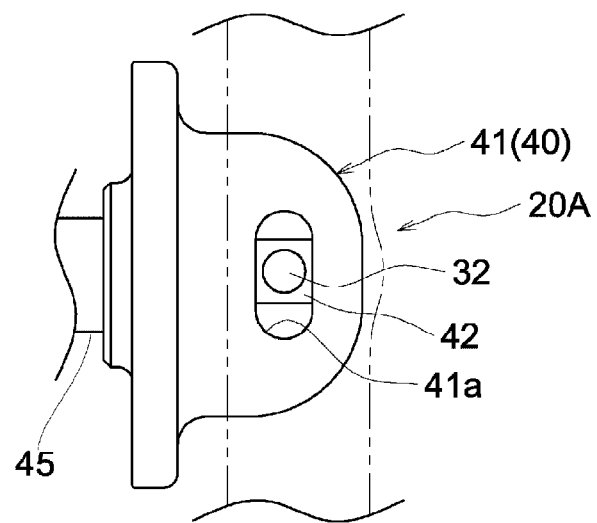
FIG. 4 An enlarged view of an actuator-side connecting part.

As shown in FIG. 4, at the actuator-side connecting part 20A of the link lever 20, a pin through hole 41a is formed in the operating unit 41 of the actuator 40. The pin through hole 41a is long in the swing axis traverse direction and parallel to the swing axial direction. This pin through hole 41a has a bearing member 42 that cannot move relative to the operating unit 41, in the reciprocating directions of the operating unit 41, but can slide relative to the operating unit 41 in the swing axis traverse direction in which the pin through hole 41a is elongated. Through a hole formed in this bearing member 42, the penetration pin 32 supported by the lever members 21 is inserted.

That is, the operating unit 41 of the actuator 40 and the penetration pin 32 can be connected by surface contact through the bearing member 42, while avoiding line-contact which progresses abrasion. Since the penetration pin 32 is journaled by the bearing member 42 which can slide in the swing axis traverse direction, the penetration pin 32 is supported in such a manner as to be slidable in the swing axis traverse direction, while rattling in the reciprocating directions of the operating unit 41 is suppressed or reduced. Therefore, reciprocation of the operating unit 41 can be suitably transmitted to the link lever 20 through the penetration pin 32. It should be noted that modification of the shape, configuration, and the like may be modified. For example, the bearing member 42 may be omitted, and the penetration pin 32 may be directly inserted into the pin through hole 41a.

Figure 5:
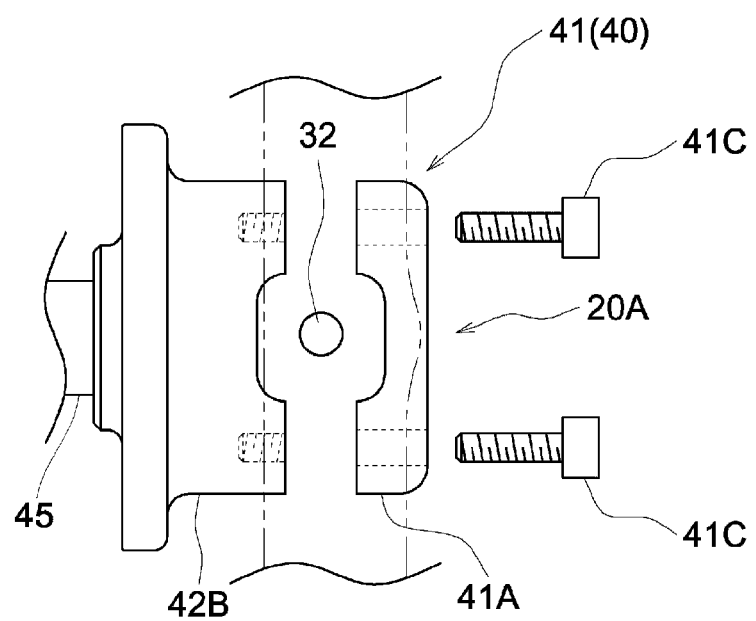
FIG. 5 An enlarged view of the actuator-side connecting part of another embodiment.

It should be noted that, the present embodiment deals with a case where the operating unit 41 of the actuator 40 is configured in one piece; however, for example, the operating unit 41 can be configured to be separable into front and rear pieces relative to the reciprocating directions, as shown in FIG. 5. That is, in this configuration, the operating unit 41 is configured as a member that is separable, at the center portion of the pin through hole 41a, into a distal end member 41A on the distal end side and a proximal end member 42B on the proximal end side. The distal end member 41A and the proximal end member 42B can be combined into one piece by joining them with a plurality of screws 41C. With this, the bearing member 42 with the penetration pin 32 inserted therethrough can be inserted to the pin through hole 41a in a radial direction, while the operating unit 41 is separated. By assembling the operating unit 41 thereafter, there is no need for a space for inserting the penetration pin 32 from a lateral side.

Figure 6:
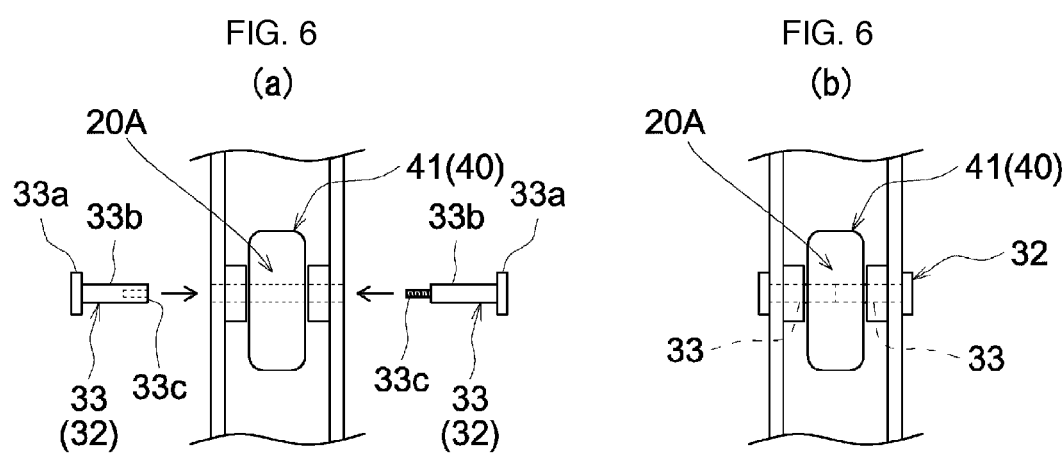
FIG. 6 A diagram explaining a configuration of a penetration pin in another embodiment.

Although the penetration pin 32 to be inserted into the operating unit 41 of the actuator 40 can be structured in one piece, the penetration pin 32 may also be separable into a plurality of pieces in its axial direction, as shown in FIG. 6. That is, the penetration pin 32 is separable into two pin members 33. Each of the separable pin members 33 is configured in a T-shape, which includes a head 33a to abut the exterior side of the lever member 21 and a shaft 33b extending from the head 33a. These two pin members 33 are connectable to each other by threaded portions 33c formed at the distal ends of the shafts 33b. Such a penetration pin 32 can connect the lever members 21 to the operating unit 41, even if a sufficient space for inserting the penetration pin 32 is not available on the lateral sides of the pair of the lever members 21. To connect the lever members 21 to the operating unit 41 in this case, the two pin members 33 are inserted from the exterior sides of the pair of lever members 21 into the operating unit 41 in the interior side (see FIG. 6(a)), and then screw-fastening the threaded portions 33c at the distal end portions of the shafts 33b (see FIG. 6(b)).

Other Embodiments

The following describes other embodiments of the present invention. The configurations of the embodiments described hereinbelow are not limited to being applied individually, but may be applied in combination with the configurations of other embodiments.

Figure 8:
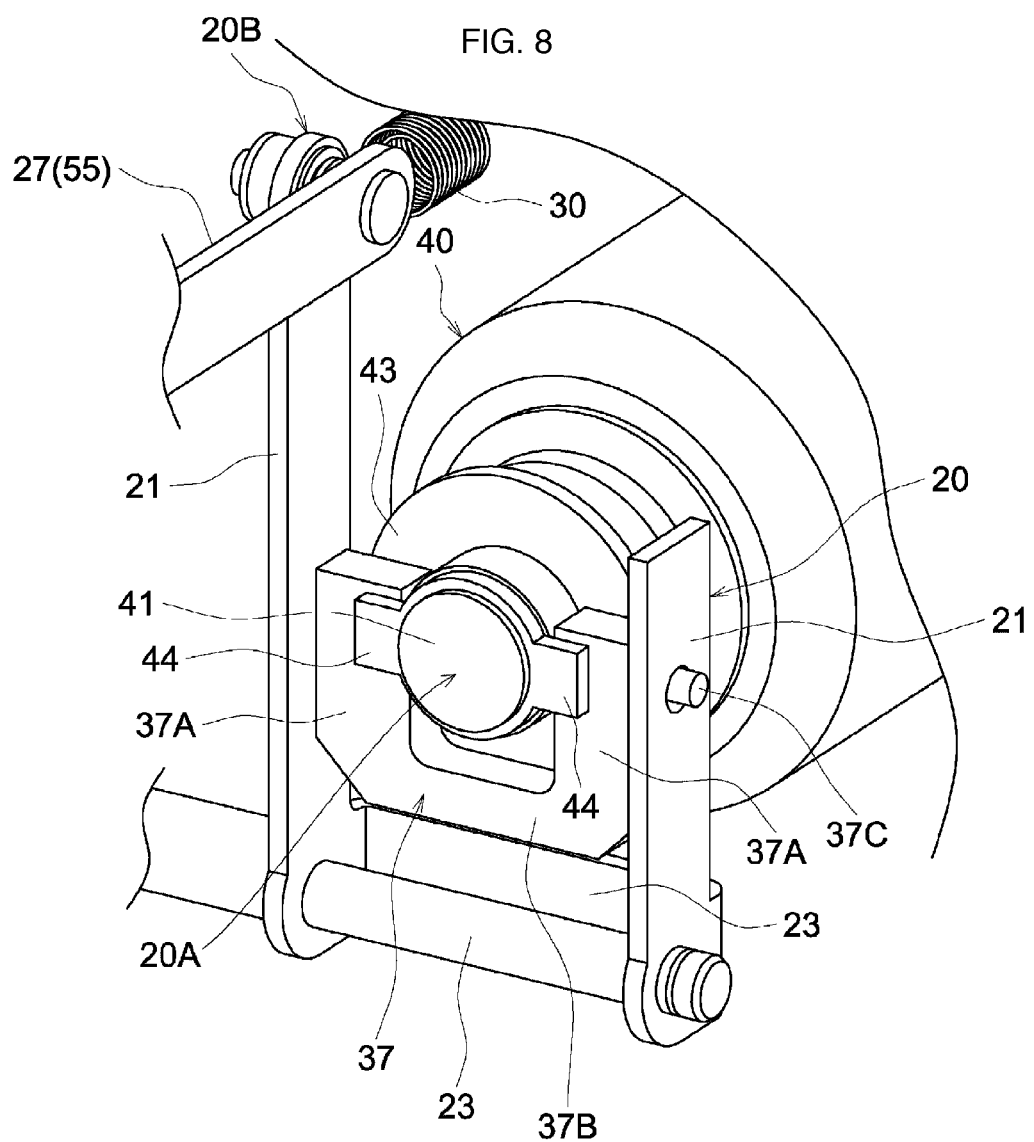
FIG. 8 A perspective view showing a configuration of a fuel injection device in another embodiment.

(1) The following describes, with reference to FIG. 8, a difference in the link lever 20, and the actuator-side connecting part 20A and the rack-side connecting part 20B of the link lever 20 of another embodiment over the above described embodiment. However, descriptions are omitted as to the configurations similar to that of the above embodiments.

A link lever 20 shown in FIG. 8 is configured by bending two sides of a plate member in the same direction to form a U-shaped cross-section, and the portions bent are used as a pair of lever members 21, as in the above-described embodiment. Then, the pair of lever members 21 are connected only through a coupling portion 23 on the pivot shaft member 25 side, and are capable of integrally swinging.

Further, a rack-side connecting part 20B to be connected to the control rack 55 via an arm 27 is provided on the distal end portion on one of the lever members 21. To this rack-side connecting part 20B, a spring 30 for suppressing and reducing rattling of the link lever 20 is connected.

An operating unit 41 of the actuator 40 shown in FIG. 8 has a disc-shaped base plate member 43, and a pair of protruding part 44 protruding toward the pair of lever members 21 at a further distal end side of the base plate member 43.

The pair of lever members 21 has therebetween a U-shaped receiving member 37 including a pair of side parts 37A extended along the interior side of the lever members 21 and a connection part 37B connecting the proximal end sides of the side parts 37A. This receiving member 37 is rotatably attached via shaft parts 37C arranged on the distal end sides of the side parts 37A.

With this configuration, in the assembling work to attach the link lever 20, the side parts 37A of the receiving member 37 can be easily inserted, while rotating the receiving member 37 about the shaft parts 37C, between the base plate member 43 and protruding parts 44 of the operating unit 41 of the actuator 40. Further, by assembling the link lever 20 in this manner, reciprocation of the operating unit 41 can be suitably transmitted to the link lever 20 via the receiving member 37.

The assembling work of the link lever 20 becomes further easier, by making the protruding parts 44 of the operating unit 41 rotatable about the center shaft of the operating unit 41 or interposing a spring and the like and making the protruding parts 44 detachable from the base plate member 43.

Figure 9:
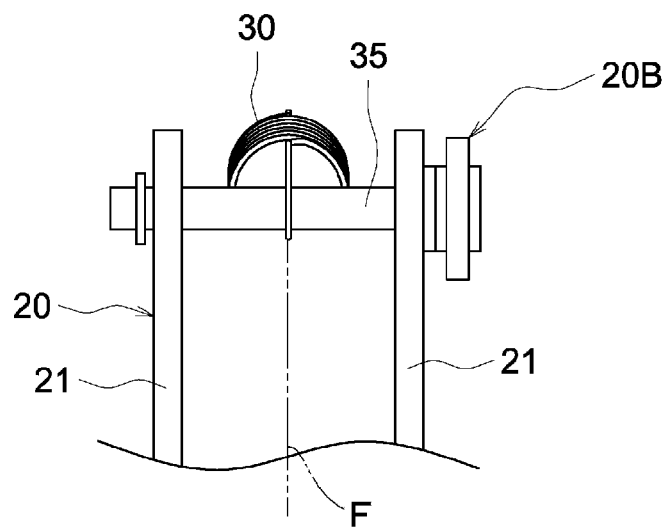
FIG. 9 An enlarged view of a rack-side connecting part in another embodiment.
Figure 10:
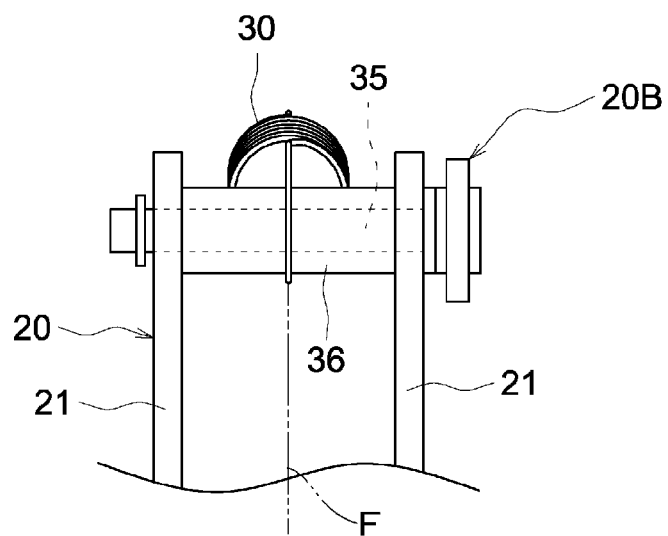
FIG. 10 An enlarged view of a rack-side connecting part in another embodiment.

(2) The following describes, with reference to FIG. 9 and FIG. 10, a difference in the rack-side connecting part 20B of another embodiment over the above described embodiment. However, descriptions are omitted as to the configurations similar to that of the above embodiments.

At the rack-side connecting part 20B shown in FIG. 9, a penetration pin 35 bridged between a pair of lever members 21 is provided. To a center portion of this penetration pin 35, a spring 30 for suppressing and reducing rattling of the link lever 20 is connected. Further, to an end portion of the penetration pin 35, an arm 27 to be connected to the control rack 55 is connected. With this, the rigidity of the link lever 20 is further improved, and the pair of link lever members 21 more integrally swing at the rack-side connecting part 20B. Further, the position where the spring 30 is connected to the link lever 20 deviates from the center of the operating unit 41 of the actuator 40 relative to the swing axis traverse direction, and the position where the spring 30 is connected and the center of the operating unit 41 of the actuator 40 are on the same plane F which perpendicularly crosses the swing axis of the link lever 20. This way, a bending moment applied to the operating shaft of the actuator 40 can be reduced.

Further, in the configuration shown in FIG. 9, an end portion of the penetration pin 35 is connected to the control rack 55 side. Therefore, when the link lever 20 swings, the penetration pin 35 slightly rotates and swings, causing friction between the penetration pin 35 and the connecting part of the spring 30.

In view of this, the spring 30 is not directly connected to the penetration pin 35, so that the friction can be reduced.

For example, in a rack-side connecting part 20B shown in FIG. 10, a cylindrical member 36 is provided between the pair of lever members 21, and the penetration pin 35 is inserted through the cylindrical member 36. The spring 30 is connected to a center portion of the cylindrical member 36, and the arm 27 to which the control rack 55 is connected is connected to an end portion of the penetration pin 35. With this configuration, friction between the spring 30 and the cylindrical member 36 can be avoided even when the penetration pin 35 rotates and swings.

(3) Of the planes perpendicularly crossing the pivot shaft member 25 in the link lever 20 of the above embodiment shown in FIG. 2, a plane passing through the rack-side connecting part 20B is laterally offset from a plane passing through the center of the actuator-side connecting part 20A.

However, to make these planes be on the same plane, for example, the axial direction of the pivot shaft member 25 may be rotated and tilted. By doing so, the force acting on the rack-side connecting part 20B can be suitably transmitted to the operating shaft 45 of the actuator 40 as a load in the direction of the operating shaft 45, without generating a bending moment that causes progress of abrasion.

INDUSTRIAL APPLICABILITY

The present invention can be applied to fuel injection devices of engines.

REFERENCE SIGNS LIST 10A housing unit
11 side wall portion
12 insertion port 20 link lever
20A actuator-side connecting part
20B rack-side connecting part
21 lever member
25 pivot shaft member
30 spring (biasing member)
32 penetration pin
40 actuator
41 operating unit
41a pin through hole
42 bearing member
45 operating shaft
51 fuel pressure-feed mechanism unit
55 control rack
100 fuel injection device
F plane

The invention claimed is:

1. A fuel injection device of an engine comprising:
a control rack supported to be slidable in an axial direction and capable of adjusting a fuel pressure-feed amount of a fuel pressure-feed mechanism unit based on its slide-position relative to the axial direction;
an actuator capable of reciprocating its operating unit along an operating shaft; and
a link lever swingably supported by a pivot shaft member and configured to swing in association with reciprocation of the operating unit of the actuator thereby causing the control rack to slide, wherein
the fuel injection device includes an actuator-side connecting part connecting the operating unit of the actuator to the link lever, and
the actuator-side connecting part is positioned on the operating shaft of the actuator.

2. The fuel injection device of an engine according to claim 1, further comprising a biasing member configured to bias the link lever in one of swinging directions of the link lever, wherein
a position where the biasing member is connected to the link lever and a center of the operating unit of the actuator are on a same plane perpendicularly crossing the axis of a swing shaft of the link lever.

3. The fuel injection device of an engine according to claim 1, wherein the link lever has, on two sides of the operating unit of the actuator sandwiching therebetween the operating unit, a pair of lever members pivotally supported by the pivot shaft member in such a manner as to integrally swing, and
the actuator-side connecting part connects both of the lever members to the operating unit of the actuator.

4. The fuel injection device of an engine according to claim 3, wherein the actuator-side connecting part is configured with a penetration pin bridged between the pair of lever members penetrating the operating unit of the actuator.

5. The fuel injection device of an engine according to claim 4, wherein a side wall portion of a housing unit accommodating the operating unit of the actuator has an insertion port through which the penetration pin is inserted into the actuator-side connecting part.

6. The fuel injection device of an engine according to claim 4, wherein the penetration pin is configured to be separable into a plurality of pieces in its axial direction.

7. The fuel injection device of an engine according to claim 4, wherein:
the operating unit of the actuator has a bearing member into which the penetration pin is inserted, and
the bearing member is not movable with respect to the operating unit in reciprocating directions of the operating unit but is slidable relative to the operating unit in a swing axis traverse direction, the swing axis traverse direction being perpendicular to the axis of the pivot shaft member and passing through the actuator-side connecting part and a rack-side connecting part.

8. The fuel injection device of an engine according to claim 4, wherein the operating unit of the actuator is separable into front and rear pieces along the reciprocating directions of the operating unit so as to allow insertion of the penetration pin into a pin through hole from a radial direction of the pin through hole, the pin through hole being a hole in which the penetration pin penetrates.

* * * * *